US010167954B2

(12) United States Patent
Meier

(10) Patent No.: US 10,167,954 B2
(45) Date of Patent: Jan. 1, 2019

(54) DEVICE AND METHOD FOR STABILIZING A PISTON RING IN A CROSSHEAD ENGINE

(76) Inventor: Jorgen Meier, Roskilde (DK)

(*) Notice: Subject to any disclaimer, the term of this patent is extended or adjusted under 35 U.S.C. 154(b) by 1035 days.

(21) Appl. No.: 12/997,065

(22) PCT Filed: Jun. 12, 2009

(86) PCT No.: PCT/EP2009/004225
§ 371 (c)(1),
(2), (4) Date: Apr. 11, 2011

(87) PCT Pub. No.: WO2009/149942
PCT Pub. Date: Dec. 17, 2009

(65) Prior Publication Data
US 2011/0260410 A1 Oct. 27, 2011

(30) Foreign Application Priority Data
Jun. 12, 2008 (DE) .................. 10 2008 028 052

(51) Int. Cl.
F02F 3/00 (2006.01)
F02F 5/00 (2006.01)
(Continued)

(52) U.S. Cl.
CPC .. *F16J 9/20* (2013.01); *F16J 9/22* (2013.01)

(58) Field of Classification Search
CPC ....................................... F16J 9/20; F16J 9/22
(Continued)

(56) References Cited

U.S. PATENT DOCUMENTS 1,862,983 A * 6/1932 Roberts .......................... 277/454
3,831,952 A * 8/1974 Geffroy .......................... 277/447
(Continued)

FOREIGN PATENT DOCUMENTS

DE    28 49 276 A1    5/1980
DE    1011 8910 A1    11/2002
(Continued)

Primary Examiner — Vishal A Patel
Assistant Examiner — Thomas L Neubauer
(74) Attorney, Agent, or Firm — Bacon & Thomas, PLLC

(57) ABSTRACT

A piston ring (6) which is arranged with radial and axial play in an associated piston ring groove (5) in a piston (1) of a reciprocating internal combustion engine can be stabilized to prevent tilting on and contact with the radially outer edge of the piston ring groove (5) by the cross section of the piston ring (6) and/or the piston ring groove (5) being designed in such a manner that a gap is formed between the lower side of the piston ring (6) and the lower supporting surface of the associated piston ring groove (5), said gap opening vertically radially outwards in the radial direction and, when the piston ring (6) is not subjected to a load, remaining open to the outside irrespective of the temperature of the piston (1) for as long as the piston ring (6) is not loaded by pressure on the top side. The effect achieved by this is that, when a piston (1) is deformed under the action of heat during operation, the initial contact between the lower side of the piston ring (6) and the opposite, lower supporting surface of the piston ring groove (5) begins at least in a region of the lower side of the piston ring (6), which region faces the piston axis, and rubbing of the piston ring (6) on the radially outer edge of the piston ring groove (5) is prevented.

23 Claims, 2 Drawing Sheets

(51) Int. Cl.
  *F16J 9/22*    (2006.01)
  *F16J 9/20*    (2006.01)
(58) Field of Classification Search
  USPC .......................................................... 277/454
  See application file for complete search history.

(56) References Cited

U.S. PATENT DOCUMENTS

| | | | | |
|---|---|---|---|---|
| 4,256,318 | A * | 3/1981 | Bush | F16J 9/26 |
| | | | | 277/435 |
| 6,131,503 | A * | 10/2000 | Takashima | 92/172 |
| 6,361,050 | B1 * | 3/2002 | Sytsma | 277/434 |
| 7,158,034 | B2 * | 1/2007 | Corbett, Jr. | 340/572.1 |
| 7,188,841 | B1 * | 3/2007 | Sytsma et al. | 277/472 |
| 2002/0117808 | A1 * | 8/2002 | Ogawa et al. | 277/443 |
| 2006/0266322 | A1 * | 11/2006 | Tomanik et al. | 123/193.4 |
| 2009/0174150 | A1 * | 7/2009 | Smith et al. | 277/442 |

FOREIGN PATENT DOCUMENTS

| | | |
|---|---|---|
| JP | 08 12 1242 A | 5/1996 |
| JP | 09 257 130 A | 9/1997 |
| JP | 2005 28 2370 A | 10/2005 |

* cited by examiner

DEVICE AND METHOD FOR STABILIZING A PISTON RING IN A CROSSHEAD ENGINE

The invention, in a first concept of the invention, relates to a method for stabilizing a piston ring that can be received with radial and axial play in an associated piston ring groove of a piston of a piston engine, in which the piston ring can be put into contact, with its radially outer circumferential surface, with the bearing surface of a cylinder bush receiving the piston and can be subjected on its inner circumferential surface to the gas pressure present at its top, and the cross section of the piston ring and/or of the piston ring groove is designed such that in the nonloaded state or the comparatively cold state only slightly loaded by gas pressure at the top, of the piston ring its underside contacts the opposed, lower support face of the associated piston ring groove, in the vicinity of the underside of the piston ring oriented toward the piston axis, and from there, a gap opening radially outward in height is formed between the underside of the piston ring and the opposed, lower support face of the piston ring groove.

The invention further relates to means for carrying out the aforementioned method, in the form of a piston ring, a piston, and/or a component for constructing a piston, each having at least one piston ring groove, and a use of the aforementioned method.

During operation, the pistons of piston engines are subjected to heat in the vicinity of their outer surface, adjacent to the combustion chamber, and in the vicinity of their inner surface they are cooled by a circulated coolant. The result is regions of different temperature. These temperate differences lead to heat deformations of the piston, and the surrounding wall becomes deformed in concave fashion inward, so that every piston ring groove that is positioned in the lower region of the piston extends obliquely upward toward the cylinder wall. In the mode of construction until now of the piston ring and piston ring groove, that is, rectangular cross sections of the piston ring and piston ring groove, the result is a situation such that the piston ring, associated with a piston ring groove inclined obliquely upward and outward, comes into contact with the material forming the edge of the piston ring groove adjacent to the cylinder wall, so that a greater part of the underside of the piston ring is subjected to the gas pressure present in the vicinity of its radially inner circumferential surface. For this reason, this piston ring is not stabilized by the gas pressure present at its top and its radially inner circumferential surface, since a majority of the underside of the piston ring is also exposed to this gas pressure. The lack of support of the underside of the piston ring leads, because of the friction between the piston ring and the surface of the cylinder bush, to rotation or twisting of the piston ring. This rotation or twisting is proportional to the aforementioned frictional forces. The consequence of this rotation or twisting is rapid wear of the piston ring groove and accordingly a short service life of the piston, which leads to high maintenance costs.

From German Patent Disclosure DE 101 18 910 A1, a piston ring arrangement is known, in which in the nonloaded state, a gap opening radially outward in height is provided between the underside of the piston ring and the lower support face of the piston ring groove. The assumption here is that the aforementioned gap is present both when the piston is warm and in the cold state. However, this is not true, taking into account the above-described change in shape of the piston caused by heat warping. Instead, there is the danger that the gap present in the cold state will disappear upon heating of the piston to operating temperature, so that the piston ring, acted upon by pressure from above, comes into contact first with the radially outer edge of the piston ring groove, with the corresponding disadvantages discussed above. Moreover, this can result in a hindrance to opening of the piston ring and thus a hindrance to the subjection of the subsequent piston rings to pressure. The result overall is therefore a high risk of wear.

It is therefore the object of the present invention to overcome the disadvantages described above and to ensure a long piston service life.

For attaining this object, it is proposed that given a piston in which upon an increase in temperature of the piston that is not loaded by gas pressure at the top, from the cold ambient state up to operating temperature, a radially outer region, far from the axis, of the lower support face of at least one piston ring groove is shifted upward relative to a radially inner region, near the axis, and the height of the gap, opening in the radial direction radially outward, between the lower support face of the piston ring groove and the underside of the associated piston ring decreases compared to its height in the cold state, the cross sections of the piston ring and of the piston ring groove, to compensate for the heat warping, occurring at high temperatures corresponding to the operating conditions, of the piston region containing the piston ring groove, are designed correspondingly such that the aforementioned gap, in the state of the piston ring that is not loaded by gas pressure at the top, does not open, even at elevated temperature, in the radial direction to the piston axis; and that the cross section of the piston ring groove is designed such that the piston ring, regardless of any kind of temperature and warping of the elements, which with their shape define the aforementioned gap, is acted upon on its radially inner circumferential surface by the gas pressure at its top.

These provisions ensure that even under unfavorable peripheral conditions, for instance a piston with a tall piston crown and with piston ring grooves provided on the lower edge of the piston skirt 8, in which heat warping can cause the piston ring grooves in the warm state to slope upward in the radially outward direction, while in the case of subjection of the piston ring to pressure from above the initial contact between the underside of the piston ring and the opposed, lower support face of the piston ring groove begins at least in a region of the underside of the piston ring oriented toward the piston axis, and straddling of the piston ring on the radially outer edge of the lower support face of the piston ring groove is prevented. The piston ring subjected to gas pressure from above will therefore, beginning at the first contact point, gradually contact the lower support face of the piston ring groove, so that regardless of the temperature, it is ensured that the gas pressure acts from above on the entire pressure area, and thus the underside of the piston ring is stabilized relative to the lower support face of the piston ring groove. Because care is taken to ensure that the gap, formed between the underside of the piston ring and the opposed lower support face of the associated piston ring groove, does not open radially inward under any circumstances, but instead always opens radially outward, the piston ring groove can advantageously also be large enough in the axial direction to ensure in every case that pressure is exerted on the radially inner circumferential surface of the piston ring with the pressure that is applied to the top side of the piston ring, and thus to ensure reliable opening of the piston ring.

Advantageously, the initial contact between the underside of the piston ring and the opposed, lower support face of the piston ring groove is established in the vicinity of the radially inner edge of the piston ring. This ensures that no part of the underside of the piston ring is subjected to the gas pressure at the top and at the radially inner circumferential surface, so that very reliable stabilization of the piston ring is the result.

A further advantageous provision can be that the rise of the underside of the piston ring is greater than the rise of the upward-inclined, lower support face of the associated piston ring groove of the deformed piston. This ensures that the initial contact between the underside of the piston ring and the lower support face of the associated piston ring groove always takes place in the desired manner.

A further advantageous feature of the primary provisions can be that the underside of the piston ring, and preferably the lower support face of the piston ring groove as well, is or are armored at least in the vicinity of their radially inner edge or edges.

Further advantageous features and expedient extensions of the primary provisions will become apparent from the ensuing description of one exemplary embodiment in conjunction with the drawings.

The primary field of application of the invention is large engines, in particular two-stroke large diesel engines, of the kind typically used as ship engines or drives for large stationary power plants. However, this is not a limitation. engines of this type normally include a plurality of cylinders, each of which contains a piston that defines an associated combustion chamber that as a rule is scavenged longitudinally flows from the bottom upward. The piston is acted upon from above in the downward stroke by the combustion pressure and in the upward stroke by the compression pressure, so that during every longitudinal motion of the piston, a gas pressure at the top is exerted on it.

Figure 1:
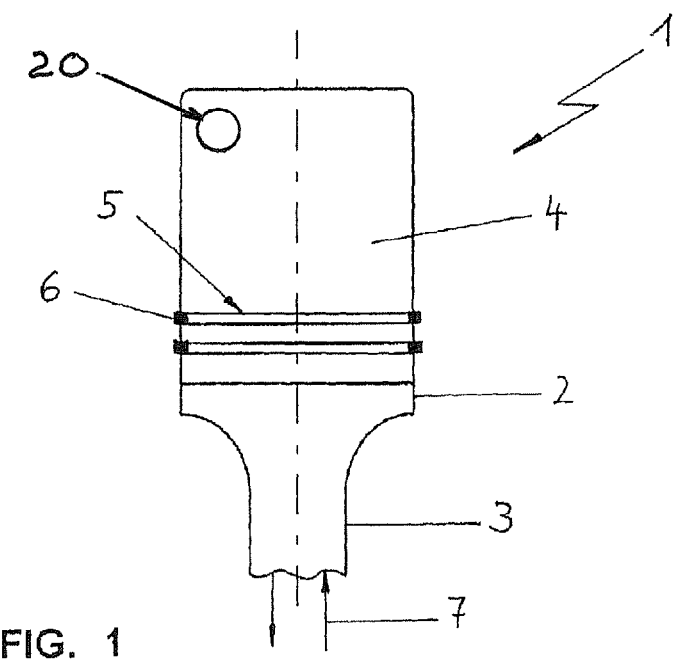
FIG. 1 shows a piston with a tall piston crown.

The pistons usually have a tall piston crown (high top land type). A piston 1 of this kind is shown in FIG. 1. The piston 1 contains a lower part 2, which in the example shown is disposed on the upper end of a piston rod 3, and an upper part, called a piston crown, which is secured to the lower part 2. The term "high top land" means that the piston crown 4 is comparatively tall compared to the lower part 2. In the example shown, the piston crown is in one piece. However, it would also be conceivable to attach a plurality of parts to one another to form the piston crown 4. The piston crown 4 is provided with at least one piston ring groove 5, which acts as a receptacle for an associated piston ring 6. In the example shown, an arrangement with a plurality of piston ring grooves 5 and a corresponding number of piston rings 6, which form a so-called piston ring packet, is provided. The piston ring groove or grooves 5 are provided in the lower region of the piston skirt 8, or in other words in the region adjacent to the lower edge of the piston crown 4. If the piston crown 4 is constructed of a plurality of components, the piston ring grooves 5 can be associated with one component, or with a plurality of components.

The piston 1 that is the basis for FIG. 1 is part of a crosshead engine; the piston 1 is connected to an associated crosshead via the piston rod 3 and cooperates with a crankshaft via a connecting rod. However, the invention is not limited to this mode of construction, although this is indeed a primary field of application for it. The provisions according to the invention can also be employed in pistons which cooperate directly with the crankshaft via an articulated connecting rod.

In operation, the top side of the piston crown 4 is subjected to heat, as a result of the combustion occurring in the combustion chamber defined by the piston crown 4. At the same time, the piston crown 4 is cooled from the inside. To that end, the inside of the piston crown 4 is subjected to a heat-dissipating coolant. The piston 1 can be provided for this purpose with a cooling device 7, which is indicated in FIG. 1 by means of a supply line and removal line for suitable circulating coolant, such as oil or water.

Figure 2:
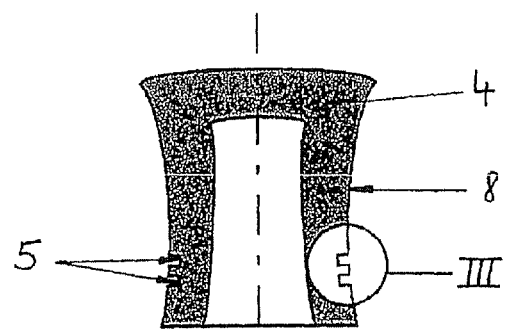
FIG. 2 is a cross section through the piston crown of the piston of FIG. 1.
Figure 3:
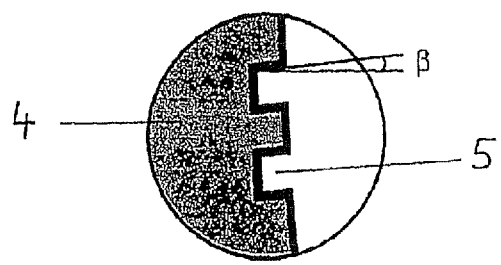
FIG. 3 shows the detail III of FIG. 2 in an enlarged view.

This subjection to heat and to coolant leads to regions of different temperatures in the material forming the piston crown 4. As a consequence, heat deformation of the piston crown 4 occurs, as is shown in FIG. 2. The piston crown 4 becomes deformed such that its surrounding skirt wall 8 is curved in concave fashion inward. The result of this is that the region, located closer to the piston axis, of the piston ring groove 5 or piston ring grooves 5 provided in the lower region of the piston crown 4 is located at a greater depth than the groove region located farther away from the piston axis in the radial direction. This means that a radially outer region, far from the axis, of the lower support face of the piston ring groove 5 is shifted upward relative to a radially inner region, near the axis, of the lower support face of the piston ring groove 5. For this reason, the piston ring groove 5 or piston ring grooves 5 that are disposed in the lower region of the piston crown 4, and thus in particular their lower support face or support faces as well, are oriented in such a way that they are inclined, sloping upward from radially inward to radially outward, as indicated in FIG. 3 by the angle β.

The cross section of the piston ring groove 5 or grooves 5 is designed such that the respective associated piston ring 6, regardless of any kind of temperature and warping of the cooperating parts, is subjected on its radially inner circumferential surface to the gas pressure present on its top side, so that its outer circumferential surface reliably contacts the inside of the cylinder bush 9. For that purpose, the piston rings 6, as can be seen from FIGS. 4 through 7, are disposed with radial and axial play in the respective associated piston ring groove 5. Accordingly, above and behind each piston ring 6, gaps 10, 11 are provided, which communicate with one another and with a circumferential gap 12, between the circumferential surface of the piston crown 4 and the bearing surface of the cylinder bush 9. The gap 12 in turn communicates with the combustion chamber, defined by the top side of the piston 1, so that the pressure present in the combustion chamber is built up in the gap 12 and in the gaps 10, 11 as well. The lowermost piston ring of a piston ring packet can be embodied as a sealed piston ring, with ends that overlap one another. The piston rings located above it are expediently embodied as slit piston rings.

Figure 4:
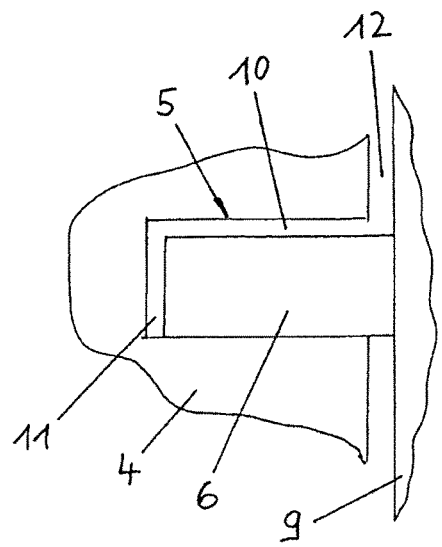
FIG. 4 shows a detail of a cylinder-piston unit of known construction with an undeformed piston.
Figure 5:
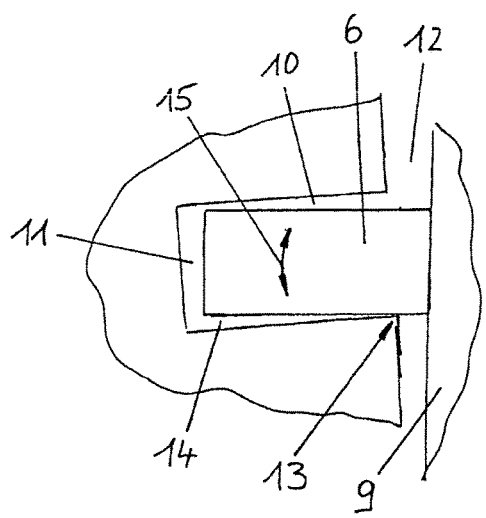
FIG. 5 shows the arrangement of FIG. 4 with a deformed piston.

In the known arrangements, shown in FIGS. 4 and 5, the piston ring 6 has an axially symmetrical rectangular cross section. The same is true for the piston ring groove 5 at ambient temperature, or in other words at a temperature below the operating temperature, when the piston crown 4 is not deformed, as shown in FIG. 4.

FIG. 5 shows the deformed piston crown 4 at operating temperature; the piston ring groove 5 is inclined, sloping upward from radially inward to radially outward, as has already been mentioned above. In this situation, the piston ring 6, which has moved downward when pressure is exerted on its top, is first braced by the edge 13, oriented toward the cylinder bush 9, of the associated piston ring groove 5; that is, the piston ring 6 rides on the radially outer edge 13 of the piston ring groove 5, and below the underside of the piston ring 6, a gap 14 is formed, which communicates with the gaps 10, 11, 12, so that a majority of the underside of the piston ring 6 is also exposed to the compression or combustion pressure in the combustion chamber. The lack of support of the underside of the piston ring 6 leads to rotation or twisting of the piston ring 6, as indicated in FIG. 5 by a double arrow 15, and this rotation or twisting leads to rapid wear of the material that forms the edge 13 of the piston ring groove 5.

Figure 6:
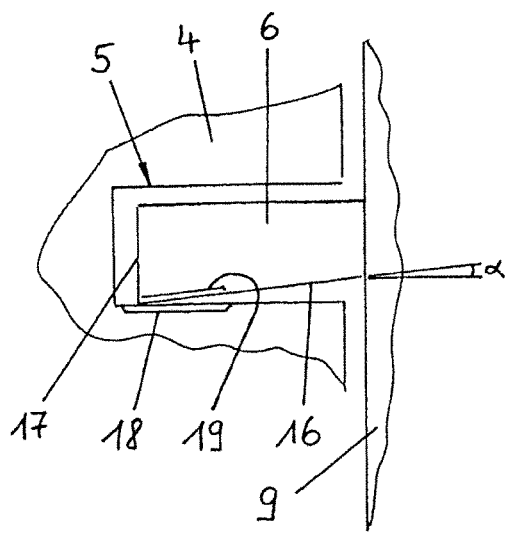
FIG. 6 shows a detail of a cylinder-piston unit according to the invention with an undeformed piston.
Figure 7:
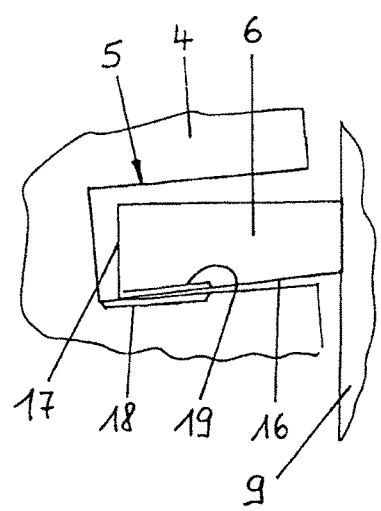
FIG. 7 shows the arrangement of FIG. 6, with a deformed piston.

To avoid phenomena of the above type, geometric ratios are provided for the piston ring 6 and the piston ring groove 5, such that even at an elevated temperature, no gap 14 of the type described above is created between the lower support face of the piston ring groove 5 and the underside of the associated piston ring 6 that is not loaded by gas pressure at the top, and that when the piston ring 6 is loaded by gas pressure at the top, the initial contact between the underside of the piston ring 6 and the lower support face of the piston ring groove 5 always takes place first in the region of the piston ring 6 having a shorter spacing from the piston axis, as shown in FIGS. 6 and 7. In no case is a gap, which opens in the radial direction inward toward the piston axis when the piston ring 6 is not being subjected to pressure at the top, allowed to occur independently of the temperature. This is true particularly for a temperature of the piston 1 corresponding to the operating temperature.

In the exemplary embodiment on which FIGS. 6 and 7 are based, the piston ring 6 has a trapezoidal cross section. This cross section deviates from an axially symmetrical rectangular cross section, and at least the radially inner region of the lower edge 16 of the cross section of the piston ring 6 extends obliquely compared to the radially inner edge 17, and thus is inclined relative to the lower support face of the piston ring groove 5 by an angle α such that an oblique rise radially outward, in this case beginning at the radially inner edge and extending radially outward, results, as FIG. 6 shows. In the exemplary embodiment shown, the inclined region of the lower edge 16 extends over the entire width of the piston ring 6, so that a steady rise in the underside of the piston ring 6 from radially inward to radially outward results. The piston ring 6 of the invention is therefore thicker, in the vicinity of its radially inner edge, than in the vicinity of its radially outer edge. This difference in thickness can amount to from 1 to 5%. Typically, from 1 to 2% is sufficient, and therefore that range is preferred.

The aforementioned rise in the underside of the piston ring 6 is, however, not smaller but preferably greater than the rise of the lower support face of the piston ring groove 5 of the deformed piston crown 4. For that purpose, the angle α indicated in FIG. 6 is as a rule greater than the angle β indicated in FIG. 3, so that even under operating conditions, that is, with the piston crown 4 deformed, the initial contact between the inclined underside of the piston ring 6 and the inclined lower support face of the piston ring groove 5 always begins in a region of the piston ring 6 that has a lesser spacing from the piston axis, preferably at the radially inner edge of the piston ring 6, as shown in FIG. 7. By the above-described design, a gap opening radially outward in the radial direction is formed between the underside of the piston ring 6 and the opposed lower support face of the piston ring groove 5, the inside height of which gap, when the piston temperature rises from the ambient temperature to operating temperature, does decrease, as a comparison of FIGS. 6 and 7 shows, but must not be allowed to vanish entirely when the piston ring 6 is not loaded.

In the exemplary embodiment shown in FIGS. 6 and 7, only the piston ring 6 is provided with an inclined underside and accordingly with a trapezoidal cross section. The cross section of the piston ring groove 5, as shown in FIG. 6 here, is rectangular when the ambient temperature is below the operating temperature of the piston crown 4; that is, no widening occurs. However, instead of an embodiment of the piston ring 6 with a greater thickness in the radially inner region than in the radially outer region, the piston ring groove 5 could also be embodied such that its inside width, when the ambient temperature is below the operating temperature, in the vicinity of its radially outer edge is greater than in the vicinity of its radially inner edge. This difference in the inside width can again amount to from 1 to 5%, preferably 1 to 2%, as has already been mentioned above for the difference in thickness of the piston ring 6. It is understood that both provisions, namely a decrease in the thickness of the piston ring 6 and an increase in the inside width of the piston ring groove 5 from radially inward to radially outward, may be provided. The piston ring groove 5 may be embodied such that only the lower support face is inclined downward radially outward, or both support faces (top and bottom) are inclined contrarily, resulting in upper and lower widened portions.

Advantageously, the lower support face of the piston ring groove 5 can be provided with armoring or a reinforcement 18, as can be seen in FIGS. 6 and 7. In the exemplary embodiment shown, the underside of the piston ring 6 is also provided with armoring or a reinforcement 19. Each of these reinforcements can extend over the full width of the piston ring groove 5 and piston ring 6, respectively. As a rule, however, it suffices if only the radially inner region or regions of the piston ring groove 5 and/or the piston ring 6 are armored, as FIGS. 6 and 7 show.

In a piston ring packet with a plurality of piston rings 6, one or more or preferably all the piston rings 6 can be stabilized in the manner according to the invention as described above. However, it would also be conceivable to stabilize only some or only one of the piston rings 6 of a piston ring packet in the manner of the invention, but not the other piston rings 6 or a remaining piston ring 6. The same naturally applies if one component of a constructed piston has a plurality of piston ring grooves 5.

Experience shows that the cross sections of different piston rings can be quite similar, so that distinguishing them visually can be very difficult or often completely impossible. If a selection must be made, it can therefore mean the wrong selection. Selecting the wrong piston ring, however, can have grave consequences. The situation is similar for a piston or piston component having a piston ring groove. Once again, the cross section of different piston ring grooves is quite similar, so that again a visual selection can be made only with difficulty, so that there is the risk of making the wrong selection. It is practical for a marking 20 on the piston ring or and/or piston and/or piston component to be provided that contains stored data for unequivocal identification of the piston ring and/or piston and/or piston component. Advantageously, this can involve an RFID marking.

Experience shows that the amount of data produced in conjunction with the purchase of a piston ring and/or piston and/or piston component by classification companies or other organizations, such as the IMO, along with environmental protection regulations and so forth, is ever-increasing, making it quite inconvenient or almost impossible any longer to provide data by means of engraving or the like. Therefore the marking is expediently embodied as a marking that can be attached in contactless fashion and/or is readable in contactless fashion.

The marking is expediently located in a region whose temperature, under operating conditions, can be kept within a range of 180° C. or below. Experience shows that this can be expected on the underside of a piston ring and/or piston, as a consequence of the intensive cooling effective there of the support face of the associated piston ring groove or of the lower piston region. The marking is therefore expediently located on the underside of the piston ring or piston. The data medium containing the marking expediently has a flat elongated configuration, so that it can be accommodated in a flat, closed peripheral recess of the piston ring or piston, as a result of which the mutual contact and sealing of the components touching one another, as well as flexibility, are unimpaired. Placing the marking on the underside of the piston moreover has the advantage that for attaching or adding to the data or reading the data, a labeling and/or reading device that can be passed through a scavenging air slot of the associated cylinder bush can be used. In that way, adding to the data, for instance after an inspection and so forth, is easily possible.

As a rule, novel piston rings and/or pistons or piston components according to the invention are already used with piston ring grooves of the invention in the production of a new motor. It would also be conceivable for such components to be built into a used motor, for instance during maintenance and/or overhaul and so forth, in order to improve the quality.

One preferred exemplary embodiment of the invention is described in detail above. However, as already indicated above, the invention is not limited to that. The invention is specified in the claims that follow.

LIST OF REFERENCE NUMERALS

1 Piston
2 Lower part
3 Piston rod
4 Piston crown
5 Piston ring groove
6 Piston ring
7 Cooling device
8 Surrounding wall
9 Cylinder bush
10 Upper gap
11 Rear gap
12 Circumferential gap
13 Radially outer edge
14 Lower gap
15 Rotation or twisting device
16 Lower edge
17 Radially inner edge
18 Armoring
19 Armoring

The invention claimed is:

1. A device for stabilizing a piston ring, comprising:
a piston (1) of a crosshead piston engine, the piston having a top, a skirt depending from the top and a piston ring groove (5) formed in the skirt, the piston having a high piston crown wherein said piston ring groove (5) is positioned in an area near a bottom of the piston skirt;
a piston ring (6) received with radial and axial clearance in the piston ring groove (5) of the piston (1),
wherein the piston ring (6) is adapted to be put into contact, by its radially outer circumferential surface, with the bearing surface of a cylinder bush (9) receiving the piston (1) and is subjected on its inner circumferential surface to a gas pressure present at the top of the piston ring (6), and the underside of the piston ring (6) contacts the opposed, lower support face of the associated piston ring groove (5), and from there in a nonloaded state, a gap opening radially outward in height is formed between the underside of the piston ring (6) and the opposed, lower support face of the piston ring groove (5), wherein the piston (1) has a property of warping by a rise in the temperature from the cold ambient state up to operating temperature, so that a radially outer region of the lower support face of the piston ring groove (5) is shifted upward relative to a radially inner region and whereby the cross sections of the piston ring (6) and of the piston ring groove (5) are configured correspondingly such that even in a warped state of the piston as long as no gas pressure is present said gap opens outward in the radial direction; and also the piston ring (6) is acted upon on its radially inner circumferential surface by the gas pressure at its top.

2. The device as defined by claim 1, characterized in that the piston ring (6) to be stabilized is associated with a piston (1) of a piston engine that is embodied such that in normal operation, a gas pressure at the top is exerted on it during every longitudinal motion of the piston (1).

3. The device as defined by claim 1, characterized in that a plurality of piston rings (6) of one and the same piston (1) are stabilized.

4. The device as defined by claim 1, characterized in that the piston ring (6) is associated with a piston ring groove (5) of a component particular to a piston (1).

5. The device as defined by claim 1, characterized in that the piston ring (6) is associated with a piston (1) having a piston crown higher than an underpart of the piston whereby the piston crown (4) which has at least one piston ring groove (5), provided in the vicinity of its lower edge, which groove, upon heating up of the piston (1) to operating temperature, becomes deformed such that a radially outer region, of its lower support face is shifted upward relative to a radially inner region, of its lower support face.

6. The device as defined by claim 1, characterized in that the cross section of the piston ring (6) deviates from an axially symmetrical rectangular cross section.

7. The device as defined by claim 6, characterized in that the cross sections of piston ring (6) and of the associated piston ring groove (5) deviate from axially symmetrical rectangular cross sections.

8. The device as defined by claim 1, characterized in that the cross section of the piston ring groove (5), associated with the piston ring (6) deviates from an axially symmetrical rectangular cross section.

9. The device as defined by claim 1, wherein upon deformation of the piston (1) as a consequence of heating of the piston (1) to operating temperature, the at least one piston ring groove (5) becomes deformed such that a radially outer region, of its lower support face is shifted upward relative to a radially inner region, near the axis, of its lower support face, and wherein the underside of the piston ring (6) extends from radially inward to radially outward forming between the underside of the piston ring (6) and the lower support face of the associated piston ring groove (5), a gap opening in the radial direction radially outward in height, which when the piston ring (6) is not loaded remains open outward, regardless of the temperature of the piston (1).

10. The device as defined by claim 9, in which the at least one piston ring groove (5) which, upon deformation of the piston (1) as a consequence of heating of the piston (1) to the operating temperature, slopes upward from radially inward to radially outward, characterized in that at least the radially inner region of the underside of the piston ring (6) slopes upward from radially inward to radially outward forming between the underside of the piston ring (6) and the lower support face of the associated piston ring groove (5), a gap opening in the radial direction radially outward in height, which when the piston ring (6) is not loaded remains open outward, regardless of the temperature of the piston (1).

11. The device as defined by claim 9, characterized in that at least the radially inner region of the underside of the piston ring (6) has at least the same relative rise from radially inward to radially outward as the lower support face of the associated piston ring groove (5), under operating conditions.

12. The device as defined by claim 11, characterized in that at least the radially inner region of the underside of the piston ring (6) has a higher relative rise from radially inward to radially outward than the lower support face of the associated piston ring groove (5), under operating conditions.

13. The device as defined by claim 9, characterized in that the piston ring is thicker on its radially inner edge than on its radially outer edge.

14. The device as defined by claim 13, characterized in that the piston ring is 1 to 2% thicker in the on its radially inner edge than on its radially outer edge.

15. The device as defined by claim 9, characterized in that it has a four-sided cross section, whose lower edge extends obliquely, at least compared to its radially inner edge.

16. The device as defined by claim 9, characterized in that it is associated with a piston (1) having a tall piston crown (4), which at least in the region of its lower edge has at least one piston ring groove (5) associated with the at least one piston ring (6) to be stabilized and whose circumferential surface, upon an increase in temperature to operating temperature, assumes a shape that is concave in the radially inward direction.

17. The device as defined by claim 9, characterized in that it is part of a piston ring packet.

18. The device as defined by claim 9, characterized in that the underside of the piston ring (6) is provided with armoring (19), which extends at least over the radially inner region of the underside of the piston ring (6).

19. The device as defined by claim 9, characterized in that the piston ring comprises at least one marking, embodied as an RFID element, which contains stored data for unequivocal determination of the piston ring (6).

20. The device as defined by claim 19, characterized in that said at least one marking of the piston ring is provided with data which contain specifying details for recognizing the applicable piston ring (6), and the recognition data also include production data and test data.

21. The device as defined by claim 19, characterized in that at least one marking is placed in such a way on the underside of the piston ring (6) that it does not protrude downward relative to the underside of the piston ring (6) and does not cause any interruption in the surrounding, radially inner contact region oriented toward the support face of the associated piston ring groove (5).

22. The device as defined by claim 9, characterized in that the lower side of the piston ring (6) slopes upward from radially inward to radially outward continuously from the radially inner edge to the radially outer edge.

23. The device as defined by claim 9, wherein the piston (1) is of the type with a high piston crown (4) which under running conditions underlies a thermal warp so that the piston ring groove (5) arranged in the under area of the skirt is shifted upward and comes in a position ascending to radially outward and that at least the radial inward area of the underside of the piston ring (6) is ascending more steeply than the contiguous lower support face of the piston ring groove (5) under thermal warp conditions.

\* \* \* \* \*